(12) United States Patent
De Kock

(10) Patent No.: US 8,371,424 B2
(45) Date of Patent: Feb. 12, 2013

(54) YAW DAMPER WITH PUMP

(75) Inventor: Paul De Kock, Numansdorp (NL)

(73) Assignee: Koni B.V., Oud Beijerland (NL)

( * ) Notice: Subject to any disclaimer, the term of this patent is extended or adjusted under 35 U.S.C. 154(b) by 358 days.

(21) Appl. No.: 12/699,235

(22) Filed: Feb. 3, 2010

(65) Prior Publication Data

US 2010/0193310 A1 Aug. 5, 2010

(30) Foreign Application Priority Data

Feb. 3, 2009 (NL) .................................... 2002484

(51) Int. Cl.
*F16F 9/43* (2006.01)

(52) U.S. Cl. .................. 188/322.21; 188/313; 188/314; 188/315; 188/304; 267/64.17; 267/DIG. 2

(58) Field of Classification Search ............. 188/322.21, 188/304, 313–316; 267/64.17, DIG. 2
See application file for complete search history.

(56) References Cited

U.S. PATENT DOCUMENTS

| | | | | |
|---|---|---|---|---|
| 2,207,088 A | * | 7/1940 | Coleman | 267/64.26 |
| 3,991,863 A | * | 11/1976 | Lee | 188/289 |
| 4,624,346 A | * | 11/1986 | Katz | 188/282.9 |
| 5,062,616 A | * | 11/1991 | Sommer | 267/64.17 |
| 6,793,049 B2 | * | 9/2004 | Kazmirski | 188/275 |
| 7,025,184 B2 | * | 4/2006 | Baba | 188/315 |
| 7,635,051 B2 | * | 12/2009 | Beck | 188/322.2 |
| 8,042,791 B2 | * | 10/2011 | Schmitz et al. | 267/64.17 |
| 2005/0189186 A1 | * | 9/2005 | Beck et al. | 188/322.13 |
| 2007/0175718 A1 | | 8/2007 | Beck | |
| 2007/0221457 A1 | * | 9/2007 | Schmitz et al. | 188/266 |
| 2007/0227847 A1 | * | 10/2007 | Nogami et al. | 188/322.21 |
| 2008/0029939 A1 | * | 2/2008 | Beck et al. | 267/64.17 |
| 2008/0156603 A1 | * | 7/2008 | Jung et al. | 188/284 |

FOREIGN PATENT DOCUMENTS

| | | |
|---|---|---|
| DE | 198 36 487 | 2/2000 |
| DE | 10 2007 013 982 | 10/2007 |
| DE | 10 2006 036 695 | 2/2008 |
| GB | 1 290 037 | 9/1972 |

OTHER PUBLICATIONS

Search Report dated Jun. 19, 2009, from corresponding application.

* cited by examiner

*Primary Examiner* — Robert A Siconolfi
*Assistant Examiner* — James Hsiao
(74) *Attorney, Agent, or Firm* — Young & Thompson

(57) ABSTRACT

Yaw damper for damping yaw motions between two vehicle parts. This includes in the customary manner a piston part and a cylinder part, wherein that piston part is provided with a piston which divides that cylinder part into two chambers. Between these two chambers, connecting lines are present. The embodiment of these connecting lines determines the damping characteristic which governs the motion between the piston and the cylinder part. Especially for vehicle parts which move at higher speeds and/or high frequencies, such as train sets, it is desirable to provide a damper which is as stiff as possible. For this purpose, the present invention proposes the installation of pumping elements which, as far as possible, increase the pressure in the chambers which are formed by the piston in the cylinder part. Preferably, this construction is realized such that this pressure automatically decreases at lower speeds and/or low frequencies.

10 Claims, 1 Drawing Sheet

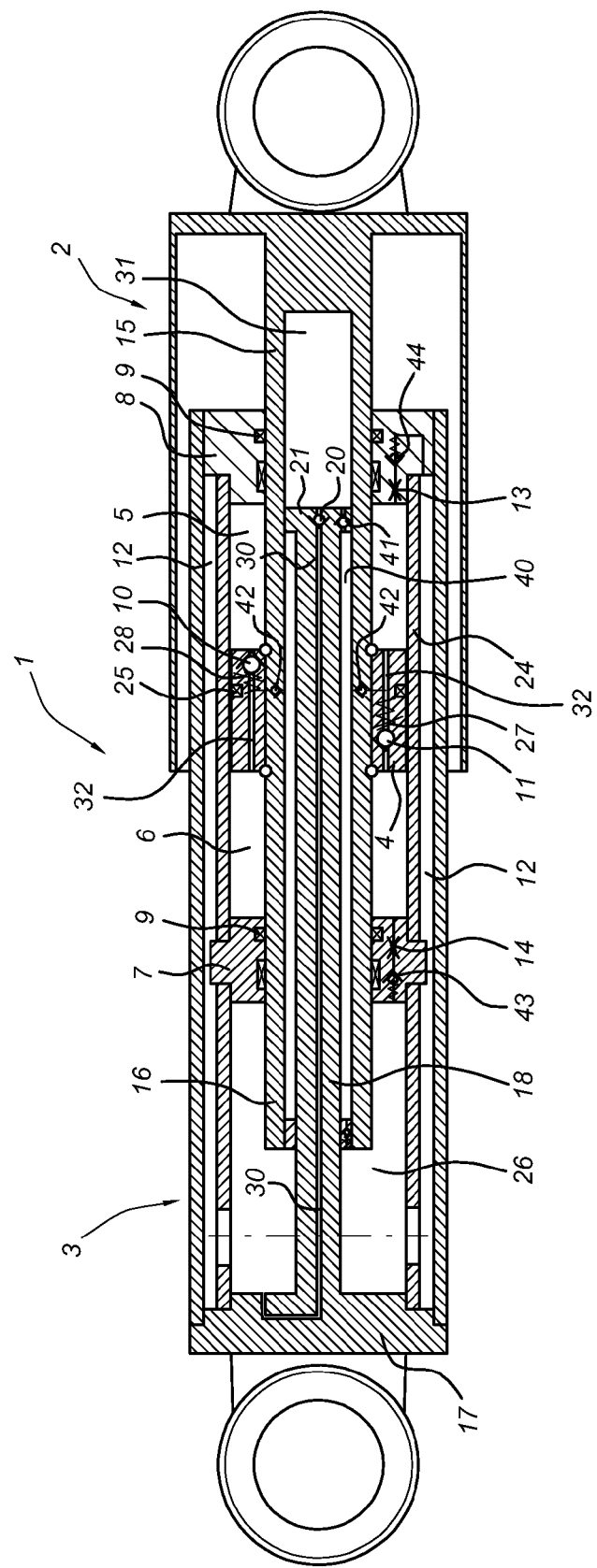

YAW DAMPER WITH PUMP

FIELD OF THE INVENTION

The present invention relates to a yaw damper for damping yaw motions between two vehicle parts.

BACKGROUND OF THE INVENTION

A yaw damper, which will often be employed horizontally, is preferably used between two bogies or between a bogie and a vehicle part, in particular a rail vehicle. A wheel set is thereby prevented from leaving the rails.

Yaw dampers of this type are generally employed in railway engineering and the connecting lines in the damper which can determine the damping characteristic are either fitted in the piston of the piston part or are constructed as a by-pass in the cylinder part. Self-evidently, combinations of both constructions are possible.

With the increase in travel speeds on the railway, the demands placed upon yaw dampers are becoming higher. In particular, "stiffer" constructions are demanded. This can be effected by constructing the various components of the yaw damper with greater wall thickness and larger dimensioning. It is also possible to choose higher initial pressure of the chambers separated by the piston of the piston part, by utilizing gas primary pressure and the like to create a permanent pretension. However, such constructions make a yaw damper heavy and complicated, and operating reliability declines. Such drawbacks are particularly disadvantageous in railway engineering. For some applications, moreover, it is desirable for the stiffness of the damper to be dependent on the travel speed.

DE 19836487 discloses a so-called Nivomat, which is fitted in the wheel suspension of a vehicle and with which the level of the vehicle with respect to the road is kept constant. For this purpose, the piston rod is of hollow construction and within it moves a pin which extends from the cylinder bottom and is provided with a bore, connected to a reservoir. When the vehicle is close to ground level, this pin forms a sealing closure in the bore of the piston, so that, upon mutual displacement, pumping action is obtained via non-return valves fitted for this purpose. As soon as the piston part and the cylinder part move apart, a groove in the pin communicates with one of the chambers, whereby the pin is no longer accommodated in tight-closing arrangement in the bore of the piston part, and pumping means, as a result of fluid leaks, are no longer effective. This occurs if the desired level has been reached.

The piston part is provided in the customary manner with valves which determine the characteristic of the damping, as well as a constant which, in the case of low displacement speed or standstill of the piston part with respect to the cylinder part, provides pressure equalization of the two chambers separated by the piston part. Such a damper is not suitable for railway application as a yaw damper.

It is therefore an object of the present invention is to provide a yaw damper of simple construction, which at desired moments is sufficiently stiff and has relatively low weight.

SUMMARY OF THE INVENTION

In one aspect this invention relates to a yaw damper for damping yaw motions between two vehicle parts, comprising a cylinder part provided with a fastening to a vehicle part, and a piston part displaceable in this cylinder and provided with a fastening to another vehicle part, wherein said piston part comprises a piston which divides said cylinder part into two chambers, wherein between said chambers connecting lines are arranged, with one-way valves accommodated therein, said connecting lines with one-way valves determine the piston/cylinder damping characteristic, wherein a fluid reservoir is present, connectable to one of said chambers, wherein in that in the yaw damper pumping means are provided, driven by the displacement of said piston part with respect to that cylinder part, the inlet of said pumping means being connected to said reservoir and the outlet being connected via non-return valves to each of said chambers, and said pumping means being constantly effective irrespective of the position of the piston part with respect to the cylinder part.

According to this aspect of the invention, actively operating pumping means are present in the damper. Operation thereof is brought about by the reciprocal motion of the piston part and the cylinder part. That is to say, if a large number of yaw motions are present, the pump will be particularly active, whereas, with fewer yaw motions, the pumping means are less active. A large number of yaw motions are generally encountered at higher speeds and fewer yaw motions at lower speed. By placing the chambers separated by the piston of the piston part under a primary pressure with the pumping means, a greater damper stiffness can be obtained. This primary pressure is generated in the course of travel and there is no problem whatsoever that this primary pressure, following operation, will disappear again. There is hence no need to place particularly high demands upon the seals used in the yaw damper. Preferably, the pumping means are constructed such that both chambers are increased in pressure to the same extent. Because the chambers which are defined by the piston of the piston part have the same pressure, the increase in pressure will theoretically have no effect on the damping characteristics. After all, these are determined by the displacement of the piston in the cylinder part and the thereby encountered resistance, which is reduced by the presence of the connecting lines between the two chambers.

Starting from any position of the piston part with respect to the cylinder part, when the piston part and the cylinder part move closer together (inward stroke), an increase in pressure of the fluid will always be created by the pumping means, which is transmitted to both chambers.

More particularly it is the case that, irrespective of the position of the piston part and the cylinder part during a mutual displacement x thereof, always one and the same quantity of damping fluid y is displaced by the pumping means via the outlet to each chamber (given otherwise equal conditions in this chamber).

According to a further aspect of the invention, the pumping means are a piston/cylinder pump. The piston can expediently be delimited by providing the cylinder part with a (central) pin which acts as a piston. In such a variant, the piston part is provided with a hollow piston pin, the pin, which protrudes from the cylinder part, being able to move to and fro in this cavity. Such a plunger pump can be realized in a particularly simple manner and the desired pumping output can be obtained through the suitable embodiment of the various cross-sectional surfaces.

According to a further aspect of the invention, one or both chambers are provided with a permanent connection to the reservoir. This connection is realized such that, in the event of an overpressure in one of the chambers, a leak of fluid to a central fluid reservoir occurs. This fluid leak is of such small magnitude that the damping characteristics of the cylinder damper are not negatively influenced thereby. However, this leak results in a gradual lowering of the pressure generated by pumping means according to the invention. At "average"

travel speed, a pumping-up effect will take place, because the fluid delivery of the pumping means is greater than the discharge through the above-described connections. At lower speeds, however, the discharge will be greater, whereby the damper becomes softer. That is to say that, at lower travel speeds, a relatively soft damper will result from this construction, whereas, at higher speeds, a relatively stiff damper will be present.

According to a further particular aspect of the present invention, the connection of each chamber with the outlet of the pumping means is realized substantially identically. That is to say that the pressure generated by the pumping means is offered in equal measure to both chambers and, more particularly, is always offered directly to both chambers. Non-return valves can here be present in the outlet, between the outlet and each of the chambers, and the pressure in one of the chambers, depending on the mutual displacement of the cylinder part and the piston part, can naturally be higher than in the other of the chambers, whereby, when pressure is increased by the pumping means, the flow of fluid to each of the chambers may be different.

BRIEF DESCRIPTION OF THE DRAWING

The invention will be illustrated in greater detail below with reference to an illustrative embodiment represented in the drawing. The single FIGURE here shows a railway damper.

DETAILED DESCRIPTION OF THE DRAWING

In FIG. 1, the railway damper according to the invention is denoted in its entirety by 1. This is embodied for preferably horizontal fitting. This damper is a so-called yaw damper and is fastened between a wheel set and the above-situated part of a wagon of a rail carriage. The damper is present to damp the yaw motions between the wheel set and the carriage.

The damper 1 consists of a piston part 2 and a cylinder part 3. Both are provided with a fastening eye (represented schematically), but fastening can naturally be effected in any manner known in the prior art. The piston part 2 is provided with a piston rod 15, which is bound to the piston 4. This piston 4 is displaceable to and fro along a cylinder 24 and a seal 25 is present on the piston 4 to provide mutual sealing with the cylinder 24. The piston 4 is delimited on either side by a chamber 5 and 6 respectively. The chamber 5 is delimited on the other side by an end plate 8, which is provided with a seal 9 for the piston rod 15. The chamber 6 is delimited on the other side by a fixedly fitted boundary 7, which is likewise provided with a seal 9 for sealing of the piston rod 15 and/or the extension 16 of this piston rod 15. In the boundary 7, a one-way valve 43 with restriction 14 is present. The piston 4 is provided with one-way valves 10 and 11 and restrictions 27 and 28. The restrictions determine the damping by the toing and froing of the piston 4 in the cylinder 24 through fluid flowing between the chambers 5 and 6.

In the end plate 8, a restriction 13 with non-return valve 44 is present, which emerge in a chamber 12 communicating with the fluid reservoir 26. The dimensioning of the restrictions 13 and 14 is very much smaller than the dimensioning of the restrictions 27 and 28. That is to say that the toing and froing motion of the piston between the chambers 5 and 6 is substantially influenced by the size of the restrictions 28 and 27 and not, or only negligibly, by the restrictions 13 and 14.

As already indicated, the piston rod 15 is extended with a part 16. This part is of hollow construction in order to receive inside it a pin 18 connected to the bottom 17 of the cylinder part 3. The pin 18 has a piston 21. A fluid line 30 with one-way valve 20 extends from the space 31 through the pin 18 to the chamber 26. Between the piston 21 and the hollow piston rod 15, an annular chamber 40 is delimited with a one-way valve 41 and one-way valves 42. Via the line 32, these one-way valves 42 emerge in the chamber 5 and 6. That is to say that the space 31 communicates via the one-way valve 41 and via substantially identical one-way valves 42 in the same way with the chamber 5 and the chamber 6. The one-way valves are connected such that fluid can flow into one or both chambers 5 and 6 only in the event of overpressure in the space 40. The one-way valve 41 is constructed such that only transport of fluid from the chamber 31 (originating from the space 26) is possible. This transport is realized in the same direction of flow, that is to say that fluid to the left of the piston 21 can be pumped only in the direction of the space 31, not in the opposite direction. This fluid to the left of the piston 21 is in contact with the reservoir 26 via a bore 35.

The above-described device works as follows:

As a result of the presence of the piston 4 and the chamber 5 and 6, the damper acts as a standard yaw damper. However, upon reciprocal motion of the piston part and the cylinder part, reciprocal motion of the piston 21 and the hollow piston rod 15 and 16 will likewise take place. As the piston part and the cylinder part move closer together, the volume in the space 31 will decrease and, through the blocking of the non-return valve 20, the fluid pressure in this space 31 will be increased. This increased pressure can flow away only via the one-way valve 41 and the space 40. Via this space 40 and one way valves 42, fluid enters into the space 5 and 6. That is to say that, as a result of the toing and froing motion of the piston part 2 and cylinder part 3 with respect to each other, the chambers 5 and 6 are "pumped up" in equal measure. This increasing of the pressure in the chambers 5 and 6, which takes place in equal measure by virtue of the same embodiment of the two one-way valves 42, has no effect on the toing and froing motion of the piston 4 between these chambers. After all, the restrictions 27 and 28 and non-return valves 10, 11 remain fully active. As a result of the increase in fluid pressure in the chambers 5 and 6, however, the damper becomes "stiffer". As a result of the higher fluid pressure in the chambers 5 and 6, the fluid present therein, generally hydraulic oil, will come closer to the properties of the linear (ideal) fluid than at a lower pressure.

As a result of the presence of the restrictions 13 and 14, which, as described above, are particularly small, the increased built-up pressure, once the reciprocal motion of the piston part and the cylinder part ceases, will be slowly lowered via the chamber 12 to the reservoir 26.

This means that if a lot of reciprocal motion exists between the piston part 2 and the cylinder part the damper is relatively stiff, and if less motion exists between the piston part and the cylinder part the damper is "softer".

This is consistent with the desired damping characteristic of a yaw damper for a railway carriage. At high speeds, the piston part and the cylinder part of the damper will move with respect to each other at high frequency and the damper will be stiff. At relatively low speeds, the above-described "pump-up" effect will arise less as a result of the presence of the restrictions 13, 14, and the damper will be softer.

After the above, variants will immediately suggest themselves to persons skilled in the art. For instance, it is possible to place the pumping means according to the invention outside the damper or at some other non-central location. Moreover, these can be realized as a pump other than a plunger pump. Likewise, the connections between the chambers and the fluid reservoir can be realized differently. For instance, it is possible to install the particular connections directly in the wall of the cylinder part. The same applies to the outlet of the pumping means. This can likewise communicate differently with the above-stated chambers 5 and 6.

The invention claimed is:

1. A yaw damper for damping yaw motions between first and second vehicle parts, the yaw damper comprising:
a cylinder part provided with a fastening to one of said first and second vehicle parts;
a piston part displaceable in said cylinder part and provided with a fastening to the other of said first and second vehicle parts, wherein said piston part comprises a piston which divides said cylinder part into first and second chambers, connecting lines with one-way valves accommodated therein arranged between said first and second chambers, said connecting lines with one-way valves determining a piston/cylinder damping characteristic;
a fluid reservoir connectable to one of said first and second chambers; and
pumping means driven by a displacement of said piston part with respect to said cylinder part, said pumping means having an inlet and an outlet, said inlet being connected to said fluid reservoir and said outlet being connected to each of said first and second chambers independently via first and second non-return valves, respectively, said pumping means being constantly effective irrespective of a position of said piston part with respect to said cylinder part.

2. The yaw damper according to claim 1, wherein said outlet and connections to said first and second chambers are configured so that pressure increases in said first and second chambers are substantially identical when fluid is pumped to said first and second chambers.

3. The yaw damper according claim 1, further comprising a first fluid connection between said first chamber and said fluid reservoir and a second fluid connection between said second chamber and said fluid reservoir, said first and second fluid connections being independent of each other and rendering a fluid flow possible at an overpressure in one or both of said first and second chambers with respect to said fluid reservoir, wherein dimensions of said first and second fluid connections are such that a quantity of fluid flowing therethrough is no more than 10% of a quantity of fluid which flows through said connecting lines between said first and second chambers at a pressure difference between said first and second chambers.

4. The yaw damper according to claim 1, wherein dimensions of said first and second fluid connections are such that, at a pumping frequency of at least 2-4 Hz, a quantity of fluid pumped by said pumping means is greater than a quantity of fluid discharged through said connecting lines.

5. The yaw damper according to claim 1, wherein said pumping means comprise a piston/cylinder, wherein one of said piston/cylinder is connected to said piston part and the other one of said piston/cylinder is connected to said cylinder part.

6. The yaw damper according to claim 5, wherein said piston comprises a pin connected to said cylinder part.

7. The yaw damper according to claim 5, wherein said cylinder comprises a cavity provided in a rod of said piston part.

8. The yaw damper according to claim 6, wherein said pin is provided with an enlarged end that with said cavity delimits a third chamber.

9. The yaw damper according to claim 8, wherein a fourth chamber is between the enlarged end and said cavity.

10. The yaw damper according to claim 9, wherein said fourth chamber is connected to said first and second chambers.

* * * * *